United States Patent
Kairali

(10) Patent No.: US 11,157,318 B2
(45) Date of Patent: *Oct. 26, 2021

(54) OPTIMIZING TIMEOUTS AND POLLING INTERVALS

(71) Applicant: INTERNATIONAL BUSINESS MACHINES CORPORATION, Armonk, NY (US)

(72) Inventor: Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/448,375

(22) Filed: Jun. 21, 2019

(65) Prior Publication Data

US 2019/0310887 A1 Oct. 10, 2019

Related U.S. Application Data

(63) Continuation of application No. 15/399,827, filed on Jan. 6, 2017, now Pat. No. 10,372,496.

(51) Int. Cl.
*G06F 9/50* (2006.01)
*G06F 9/455* (2018.01)
*G06F 11/30* (2006.01)

(52) U.S. Cl.
CPC ............ *G06F 9/50* (2013.01); *G06F 9/45558* (2013.01); *G06F 9/5077* (2013.01); *G06F 11/30* (2013.01); *G06F 2009/45591* (2013.01)

(58) Field of Classification Search
None
See application file for complete search history.

(56) References Cited

U.S. PATENT DOCUMENTS

2012/0271908 A1* 10/2012 Luna .................. H04L 67/2833
709/216
2012/0278431 A1  11/2012 Luna
(Continued)

OTHER PUBLICATIONS

Syta, James M.; List of IBM Patents or Patent Applications Treated as Related; Jun. 21, 2019; 1 page.

*Primary Examiner* — Lewis A Bullock, Jr.
*Assistant Examiner* — Melissa A Headly
(74) *Attorney, Agent, or Firm* — Schmeiser, Olsen & Watts; Brian M. Restaura

(57) ABSTRACT

An approach is provided for managing a timeout and polling interval of an operation of an application. A recommendation specifying the timeout and polling interval is selected. The timeout and polling interval are applied to a deployed image. Based on polling intervals, numbers of polls for operations, identifications of the operations, and environments of the operations, a minimum number of polls of the operation in an environment before a successful completion of the operation is determined and an old polling interval used between the polls of the operation is determined. If the minimum number of polls is greater than one, the polling interval specified in the recommendation is determined as the minimum number of polls multiplied by the old polling interval. If the minimum number of polls equals one, the polling interval specified in the recommendation is determined by decreasing the old polling interval by a configurable factor.

17 Claims, 7 Drawing Sheets

(56) References Cited

U.S. PATENT DOCUMENTS

| | | | |
|---|---|---|---|
| 2013/0204948 A1* | 8/2013 | Zeyliger | G06F 11/328 709/206 |
| 2014/0289428 A1 | 9/2014 | Walter | |
| 2014/0304553 A1* | 10/2014 | Gondi | G06F 11/3075 714/39 |
| 2016/0170790 A1* | 6/2016 | Anand | G06F 13/102 718/1 |
| 2016/0328247 A1* | 11/2016 | Uriel | G06F 11/3055 |
| 2018/0196696 A1 | 7/2018 | Kairali | |

* cited by examiner

OPTIMIZING TIMEOUTS AND POLLING INTERVALS

CROSS REFERENCE TO RELATED APPLICATIONS

This application is a continuation application claiming priority to Ser. No. 15/399,827 filed Jan. 6, 2017, now U.S. Pat. No. 10,372,496 issued Aug. 6, 2019 the contents of which are hereby incorporated by reference.

BACKGROUND

The present invention relates to managing the provisioning of computing resources, and more particularly to determining optimal timeouts and optimal polling intervals for containers and virtual machines.

Cloud provisioning operations and transactions are complex and highly environment-dependent. The time required for a particular cloud provisioning operation may vary depending upon the context. For example, if an instance is a container (e.g., docker), the time required for a cloud to provision the instance is significantly less than the time required for the same cloud to provision a normal virtual machine instance. A timeout associated with a cloud provisioning operation or another operation is a period of time after which the operation is interrupted and/or an error condition is raised if the operation has not been successfully completed.

The monitoring of any operation or cloud object (e.g., application) includes regular checks (also known as polls) of the operation or cloud object which determine the operational status of the operation or cloud object. A polling interval is an amount of time between the start of two successive polls of an operation or cloud object. The polling interval is based on the temporal frequency of the polls of the operation or cloud object. The appropriate polling interval of a monitored operation or cloud object is related to the type of operation or cloud object being monitored, the environment of the operation or cloud object, and the performance conditions to which the monitored operation or cloud object is being subjected.

A cloud service may be unavailable in one or more clouds because a non-optimal timeout and/or a non-optimal polling interval is associated with an operation that is utilized by the cloud service.

SUMMARY

In one embodiment, the present invention provides a method of managing a timeout and a polling interval of an operation of an application. The method includes a computer receiving a type of the application. The method further includes based on the received type of the application, the computer determining that the application requires optimizations of the timeout and the polling interval of the operation. The method further includes the computer determining whether a data repository includes recommendations of timeout(s) and polling interval(s) for operation(s) of applications of the received type. The method further includes (1) if the data repository includes the recommendations, the computer (i) selecting from the recommendations a recommendation that specifies the timeout and the polling interval and (ii) applying the specified timeout and polling interval to a deployed image, or (2) if the data repository does not include the recommendations, the computer (i) receiving a user entry of values for an optimal timeout and an optimal polling interval and (ii) deploying a workload having a configuration that includes the values for the optimal timeout and the optimal polling interval.

In another embodiment, the present invention provides a computer program product including a computer-readable storage device and a computer-readable program code stored in the computer-readable storage device. The computer-readable program code includes instructions that are executed by a central processing unit (CPU) of a computer system to implement a method of managing a timeout and a polling interval of an operation of an application. The method includes the computer system receiving a type of the application. The method further includes based on the received type of the application, the computer system determining that the application requires optimizations of the timeout and the polling interval of the operation. The method further includes the computer system determining whether a data repository includes recommendations of timeout(s) and polling interval(s) for operation(s) of applications of the received type. The method further includes (1) if the data repository includes the recommendations, the computer system (i) selecting from the recommendations a recommendation that specifies the timeout and the polling interval and (ii) applying the specified timeout and polling interval to a deployed image, or (2) if the data repository does not include the recommendations, the computer system (i) receiving a user entry of values for an optimal timeout and an optimal polling interval and (ii) deploying a workload having a configuration that includes the values for the optimal timeout and the optimal polling interval.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of managing a timeout and a polling interval of an operation of an application. The method includes the computer system receiving a type of the application. The method further includes based on the received type of the application, the computer system determining that the application requires optimizations of the timeout and the polling interval of the operation. The method further includes the computer system determining whether a data repository includes recommendations of timeout(s) and polling interval(s) for operation(s) of applications of the received type. The method further includes (1) if the data repository includes the recommendations, the computer system (i) selecting from the recommendations a recommendation that specifies the timeout and the polling interval and (ii) applying the specified timeout and polling interval to a deployed image, or (2) if the data repository does not include the recommendations, the computer system (i) receiving a user entry of values for an optimal timeout and an optimal polling interval and (ii) deploying a workload having a configuration that includes the values for the optimal timeout and the optimal polling interval.

Embodiments of the present invention provide cloud provisioning management that advantageously learns from the environment and allows timeouts and polling intervals required for various operations to adapt to the context of the provisioning environment, and vary dynamically and elastically according to the needs of the operations and the environment.

DETAILED DESCRIPTION

Overview

Embodiments of the present invention provide an analysis of historic data consisting of (a) amounts of time taken to complete operations under any of multiple environments, and (b) polling intervals and numbers of polls taken with respect to operations or cloud objects being monitored. The analysis of the historic data is the basis for a recommendation of optimal (i.e., best fit) timeouts and optimal polling intervals for different combinations of operations and environments. Embodiments of the present invention provide a system that allows various cloud service providers to use operational data provided by other cloud service providers for an adaptive and proactive analysis and optimization of timeouts and polling intervals based on recommended timeout and polling interval values. As used herein, "optimize" and its variants do not require achieving complete perfection, but rather the terms mean improving toward perfection that is substantially near the apex of improvement.

The time required to complete the same cloud provisioning operations in different contexts (i.e., environments) may vary and the frequency of polling a cloud object may vary depending on the cloud environment. Current cloud management systems, however, cannot accommodate the varying times to complete cloud provisioning operations and the varying polling intervals because the current cloud management systems do not have the capability to learn from the cloud provisioning environment. Therefore, the current cloud management systems cannot provide timeouts and polling intervals that adapt to different contexts and vary dynamically and elastically based on the needs of a particular combination of a provisioning operation and the environment in which the operation is performed. The aforementioned deficiencies of current cloud management systems provide a unique challenge which is overcome by embodiments of the present invention described herein.

System for Optimizing Timeouts and Polling Intervals

Figure 1:
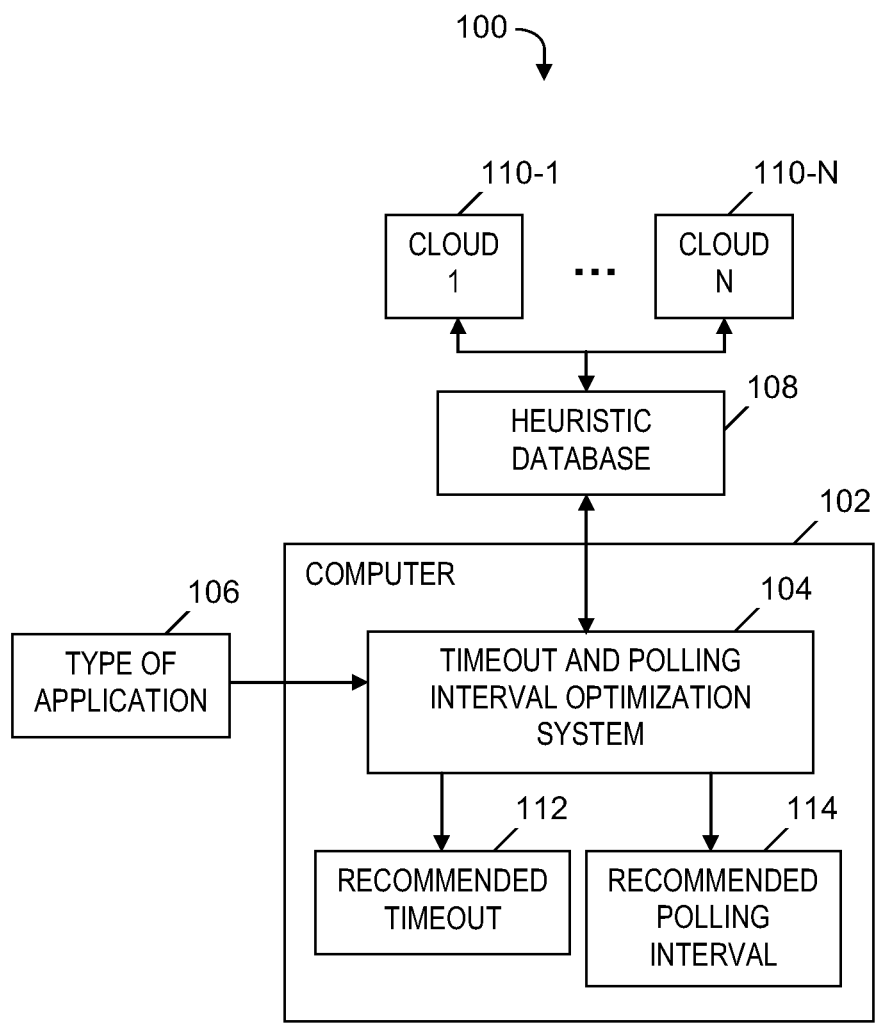
FIG. 1 is a block diagram of a system for optimizing a timeout and polling interval, in accordance with embodiments of the present invention.

FIG. 1 is a block diagram of a system 100 for optimizing a timeout and a polling interval of an operation of an application, in accordance with embodiments of the present invention. System 100 includes a computer 102 which executes a software-based timeout and polling interval optimization system 104, which receives a type of application 106 as user input, where the application performs the operation for which the timeout and polling interval are being optimized.

Timeout and polling interval optimization system 104 retrieves operation details stored in a heuristic database 108. The operation details include identifications of operations, the times taken to complete the respective operations, the polling intervals for the respective operations, the numbers of times the respective operations were polled (if any), and the environments of the respective operations. The environment includes application details if the operation is performed relative to a container.

Heuristic database 108 receives the operation details from cloud 110-1, ..., cloud 110-N, where N is an integer greater than one. Cloud service providers 1, N (not shown) control clouds 110-1, ..., 110-N, respectively. By analyzing tables in heuristic database 108 that include the operation details, timeout and polling interval optimization system 104 determines a recommended timeout 112 and a recommended polling interval 114 for a combination of an operation and a particular environment in which the operation is being performed. Timeout and polling interval optimization system 104 determines recommended timeouts and polling intervals for multiple combinations of operations and environments and allows any of the cloud service providers who provide cloud 110-1, ..., cloud 110-N to access heuristic database 108 to download any of the recommended timeouts and polling intervals, even if the cloud service provider requesting the download did not provide any of the operation details that contributed to the particular recommendations being downloaded.

A recommendation engine (not shown) may access heuristic database 108 and use the stored operation details to perform known recommendation techniques to predict optimal timeouts and optimal polling intervals.

The functionality of the components shown in FIG. 1 is described in more detail in the discussion of FIG. 2, FIG. 3, FIG. 4, and FIG. 5 presented below.

Process for Optimizing Timeouts and Polling Intervals

Figure 2:
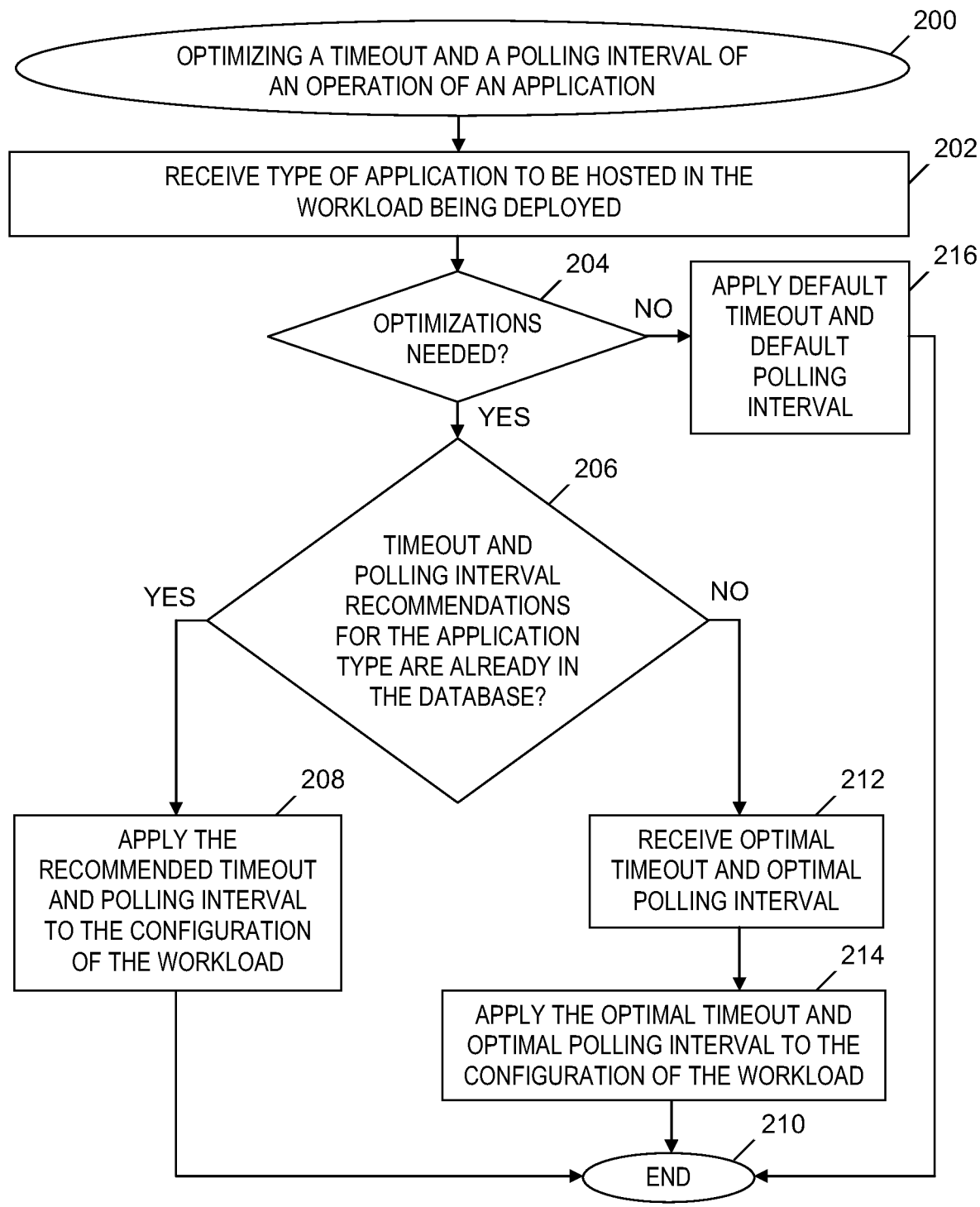
FIG. 2 is a flowchart of a process of optimizing a timeout and polling interval, where the process is implemented in the system of FIG. 1, in accordance with embodiments of the present invention.

FIG. 2 is a flowchart of a process of optimizing a timeout and polling interval of an operation of an application, where the process is implemented in the system of FIG. 1, in accordance with embodiments of the present invention. The process of FIG. 2 starts at step 200. In step 202, timeout and polling interval optimization system 104 (see FIG. 1) receives a type of an application 106 (see FIG. 1) and an operation of the application as a user input, where the received type is the type of an application to be hosted in a workload that is being deployed.

In step 204, timeout and polling interval optimization system 104 (see FIG. 1) determines whether optimizations of the timeout and polling interval for the operation of the application are needed by sending an inquiry to the user. If timeout and polling interval optimization system 104 (see FIG. 1) receives a user reply to the inquiry indicating that the aforementioned optimizations are needed, then the Yes branch of step 204 is taken and timeout and polling interval optimization system 104 (see FIG. 1) performs step 206.

In step 206, timeout and polling interval optimization system 104 (see FIG. 1) determines whether timeout and polling interval recommendations for the operation of the application are already stored in heuristic database 108 (see FIG. 1). If timeout and polling interval optimization system 104 (see FIG. 1) determines in step 206 that timeout and polling interval recommendations for the operation of the application are stored in heuristic database 108 (see FIG. 1), then the Yes branch of step 206 is taken and timeout and polling interval optimization system 104 (see FIG. 1) performs step 208. The processes of FIG. 3 and FIG. 4 determine the recommendations for timeouts and polling intervals, respectively, which are stored in heuristic database 108 (see FIG. 1).

In step 208, timeout and polling interval optimization system 104 (see FIG. 1) retrieves from heuristic database 108 the recommended timeout and polling interval recommendations for the operation of the application and applies the recommended timeout and polling interval recommendations to the configuration of the workload being deployed (i.e., to a deployed image). After step 208, the process of FIG. 2 ends at step 210.

Returning to step 206, if timeout and polling interval optimization system 104 (see FIG. 1) determines that timeout and polling recommendations for the operation of the application are not already in heuristic database 108 (see FIG. 1), then the No branch of step 206 is taken and timeout and polling interval optimization system 104 (see FIG. 1) performs step 212.

In step 212, timeout and polling interval optimization system 104 (see FIG. 1) receives as user input an optimal timeout and an optimal polling interval for the operation of the application.

In step 214, timeout and polling interval optimization system 104 (see FIG. 1) applies the received optimal timeout and optimal polling interval to the configuration of the workload being deployed.

After step 214, the process of FIG. 2 ends at step 210.

Returning to step 204, if timeout and polling interval optimization system 104 (see FIG. 1) receives a user reply to the inquiry that the aforementioned optimizations are not needed, then the No branch of step 204 is taken and timeout and polling interval optimization system 104 (see FIG. 1) performs step 216.

In step 216, timeout and polling interval optimization system 104 (see FIG. 1) applies a default timeout and a default polling interval to the configuration of the workload. Timeout and polling interval optimization system 104 (see FIG. 1) receives the default timeout and the default polling interval prior to step 216. After step 216, the process of FIG. 2 ends at step 210.

In one embodiment, timeout and polling interval optimization system 104 (see FIG. 1) determines that heuristic database 108 (see FIG. 1) does not store a specification of a first environment. Based on specifications of other environments that are stored in heuristic database 108 (see FIG. 1), timeout and polling interval optimization system 104 (see FIG. 1) determines that the first environment includes a combination of parameters of multiple environments whose specifications are stored in heuristic database 108 (see FIG. 1). Timeout and polling interval optimization system 104 (see FIG. 1) searches heuristic database 108 (see FIG. 1) and based on the search, finds and retrieves timeouts that are associated with the aforementioned multiple environments. Timeout and polling interval optimization system 104 (see FIG. 1) employs a recommendation engine which predicts an optimal timeout for the operation in the first environment based on the timeouts retrieved from heuristic database 108 (see FIG. 1) that are associated with the aforementioned multiple environments.

In one embodiment, timeout and polling interval optimization system 104 (see FIG. 1) determines that heuristic database 108 (see FIG. 1) does not store a specification of a first environment. Based on specifications of other environments that are stored in heuristic database 108 (see FIG. 1), timeout and polling interval optimization system 104 (see FIG. 1) determines that the first environment includes a combination of parameters of multiple environments whose specifications are stored in heuristic database 108 (see FIG. 1). Timeout and polling interval optimization system 104 (see FIG. 1) searches heuristic database 108 (see FIG. 1) and based on the search, finds and retrieves polling intervals and/or numbers of polls that are associated with the aforementioned multiple environments. Timeout and polling interval optimization system 104 (see FIG. 1) employs a recommendation engine which predicts an optimal polling interval for the operation in the first environment based on the polling intervals and/or the numbers of polls retrieved from heuristic database 108 (see FIG. 1) that are associated with the aforementioned multiple environments.

Determining an Optimal Timeout

Figure 3:
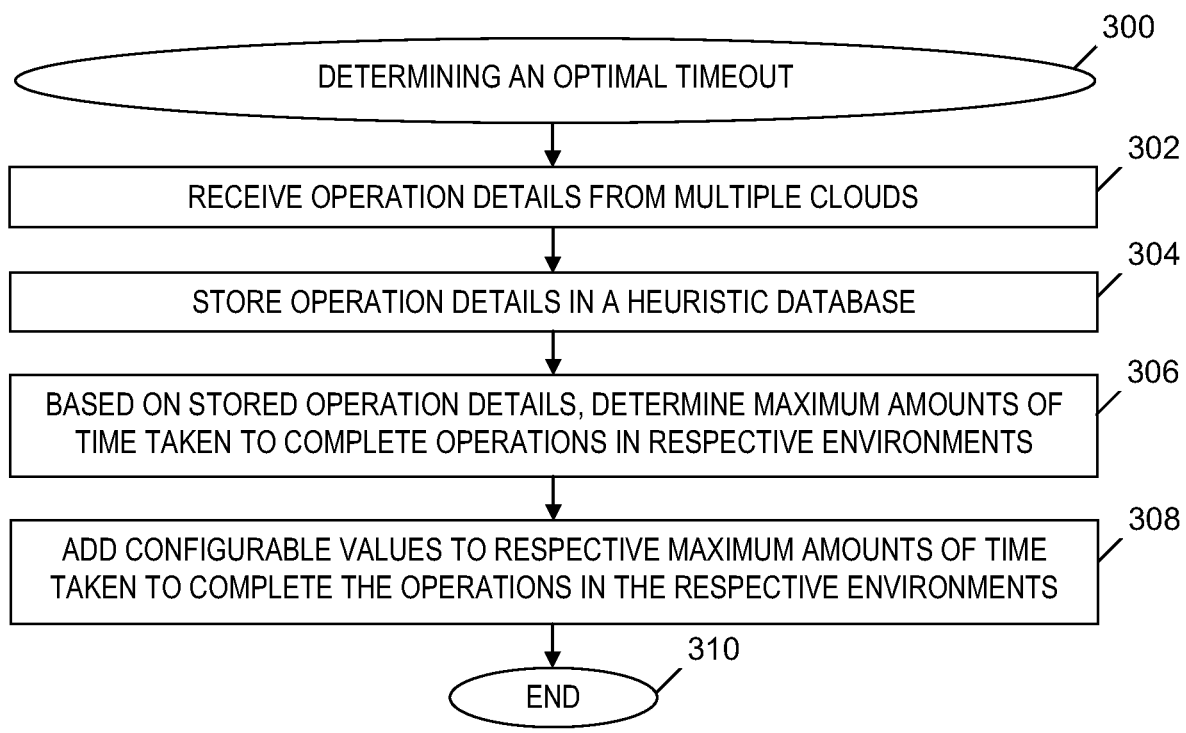
FIG. 3 is a flowchart of a process of determining an optimal timeout, which is included in the process of FIG. 2, in accordance with embodiments of the present invention.

FIG. 3 is a flowchart of a process of determining an optimal timeout, which is included in the process of FIG. 2, in accordance with embodiments of the present invention. The process of FIG. 3 precedes step 206 in FIG. 2 and begins at step 300. In step 302, timeout and polling interval optimization system 104 (see FIG. 1) receives operation details from clouds 110-1, . . . , 110-N (see FIG. 1). In one embodiment, the operation details include amounts of time taken to complete respective operations, respective identifications of the operations, and specifications of respective environments of the operations.

In step 304, timeout and polling interval optimization system 104 (see FIG. 1) stores the operation details received in step 302 in heuristic database 108 (see FIG. 1).

In step 306, based on the operation details stored in step 304, timeout and polling interval optimization system 104 (see FIG. 1) determines maximum amounts of time taken to complete respective operations in respective environments.

In step 308, timeout and polling interval optimization system 104 (see FIG. 1) determines optimal timeouts by adding a configurable value to each of the maximum amounts of time taken to complete the operations in the respective environments. For example, timeout and polling interval optimization system 104 (see FIG. 1) determines a recommended optimal timeout for an operation O in an environment E, where the recommended optimal timeout equals the maximum amount of time taken to complete the operation O in the environment E added to a configurable value X.

In one embodiment, different configurable values are associated with different environments. For example, timeout and polling interval optimization system 104 (see FIG. 1) adds configurable value X to a maximum amount of time taken to complete operation O in environment E1 to obtain a first optimal timeout for operation O in environment E1, while timeout and polling interval optimization system 104 (see FIG. 1) adds configurable value Y (which is different from X) to a maximum amount of time taken to complete operation O in environment E2, where E2 is different from E1, to obtain a second optimal timeout for operation O in environment E2.

Timeout and polling interval optimization system 104 (see FIG. 1) uses the configurable values to adjust timeouts to manage network latency in particular environments and to manage other unpredictable issues.

After step 308, the process of FIG. 3 ends at step 310.

Determining an Optimal Polling Interval

Figure 4:
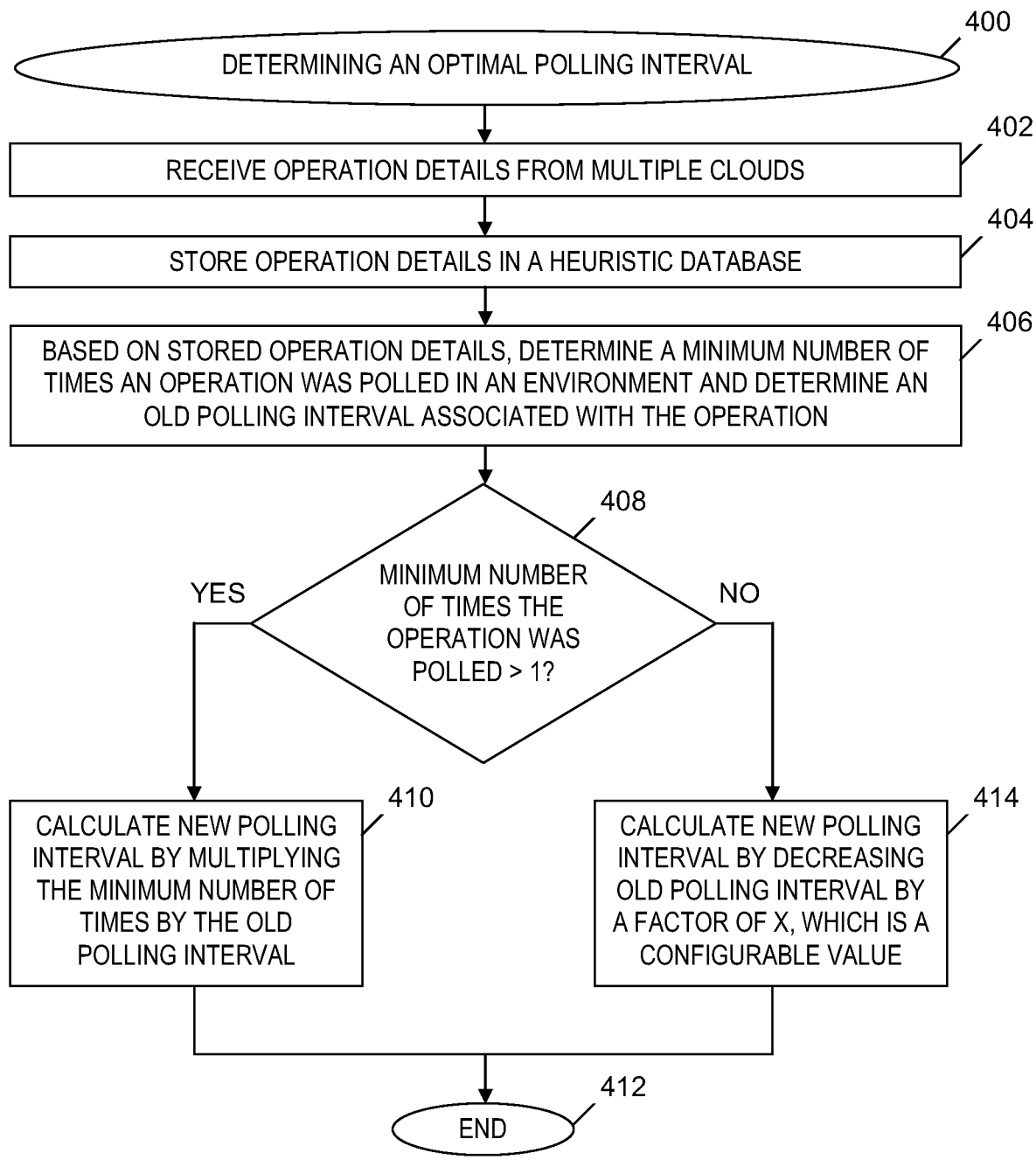
FIG. 4 is a flowchart of a process of determining an optimal polling interval, which is included in the process of FIG. 2, in accordance with embodiments of the present invention.

FIG. 4 is a flowchart of a process of determining an optimal polling interval, which is included in the process of FIG. 2, in accordance with embodiments of the present invention. The process of FIG. 4 precedes step 206 in FIG. 2 and begins at step 400. In step 402, timeout and polling interval optimization system 104 (see FIG. 1) receives operation details from clouds 110-1, . . . , 110-N (see FIG.

1). In one embodiment, the operation details include numbers of polls of operations, respective identifications of the operations, and specifications of respective environments of the operations.

In step 404, timeout and polling interval optimization system 104 (see FIG. 1) stores the operation details received in step 402 in heuristic database 108 (see FIG. 1).

In step 406, based on the operation details stored in step 404, timeout and polling interval optimization system 104 (see FIG. 1) determines a minimum number of times an operation was polled in an environment before a successful completion of the operation and determines an old polling interval that was historically used with polls of the operation.

In step 408, timeout and polling interval optimization system 104 (see FIG. 1) determines whether the minimum number of times the operation was polled is greater than one. If timeout and polling interval optimization system 104 (see FIG. 1) determines in step 408 that the minimum number of times the operation was polled is greater than one, then the Yes branch of step 408 is taken and timeout and polling interval optimization system 104 (see FIG. 1) performs step 410.

In step 410, timeout and polling interval optimization system 104 (see FIG. 1) calculates a new polling interval by multiplying the minimum number of times the operation is polled in the environment by the old polling interval determined in step 406.

After step 410, the process of FIG. 4 ends at step 412.

Returning to step 408, if timeout and polling interval optimization system 104 (see FIG. 1) determines that the minimum number of times the operation was polled in the environment is not greater than one, then the No branch of step 408 is taken and timeout and polling interval optimization system 104 (see FIG. 1) performs step 414.

In step 414, timeout and polling interval optimization system 104 (see FIG. 1) calculates a new polling interval by decreasing the old polling interval by a factor of X, where X is a configurable value. Timeout and polling interval optimization system 104 (see FIG. 1) receives the configurable value of X prior to step 414.

After step 414, the process of FIG. 4 ends at step 412.

Computer System

Figure 5:
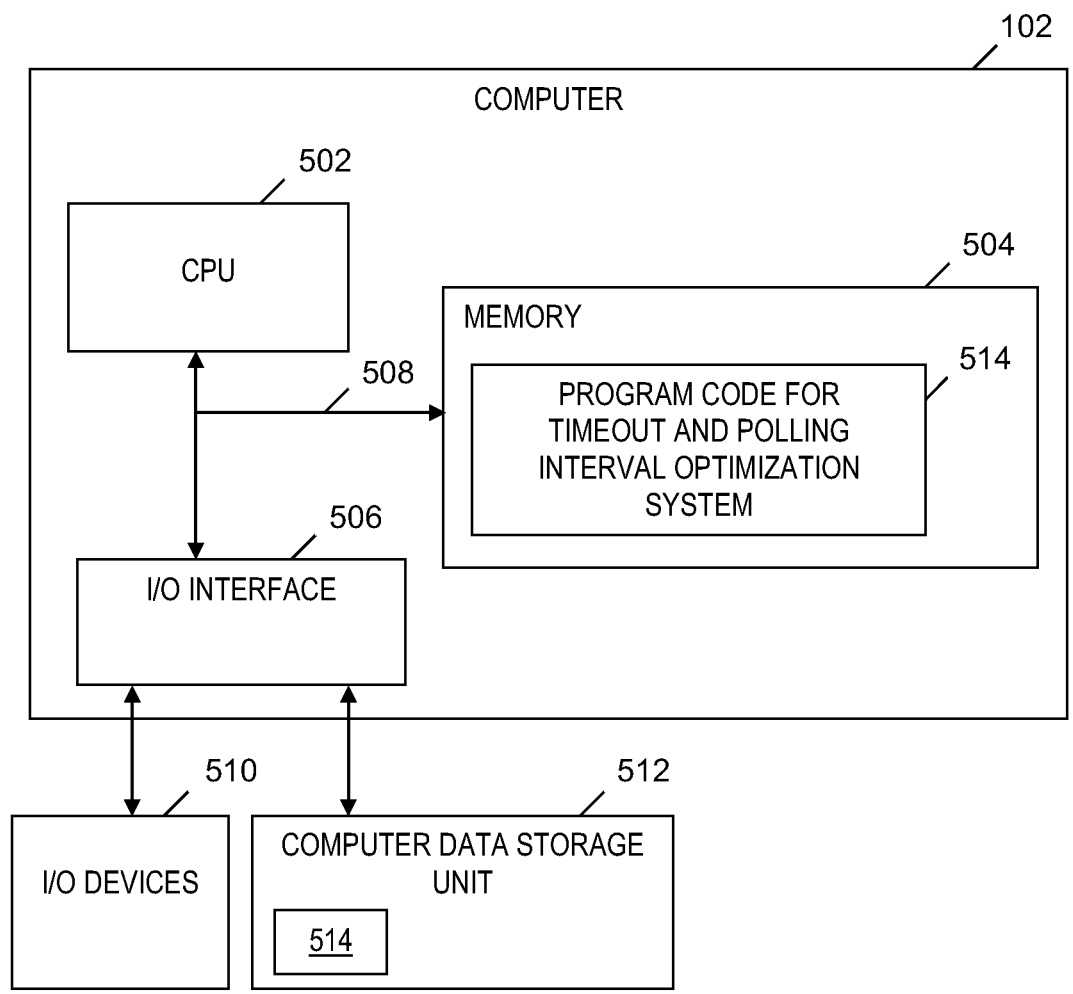
FIG. 5 is a block diagram of a computer that is included in the system of FIG. 1 and that implements the process of FIG. 2, in accordance with embodiments of the present invention.

FIG. 5 is a block diagram of a computer 102 that is included in the system of FIG. 1 and that implements the process of FIG. 2, in accordance with embodiments of the present invention. Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for timeout and polling interval optimization system 104 (see FIG. 1) to perform a method of managing a timeout and a polling interval of an operation of an application, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to manage a timeout and a polling interval of an operation of an application. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may store the type of application 106 (see FIG. 1) and/or the heuristic database 108 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to managing a timeout and a polling interval of an operation of an application. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to manage a timeout and a polling interval of an operation of an application. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing a timeout and a polling interval of an operation of an application.

While it is understood that program code 514 for managing a timeout and a polling interval of an operation of an application may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing a timeout and a polling interval of an operation of an application. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g., computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
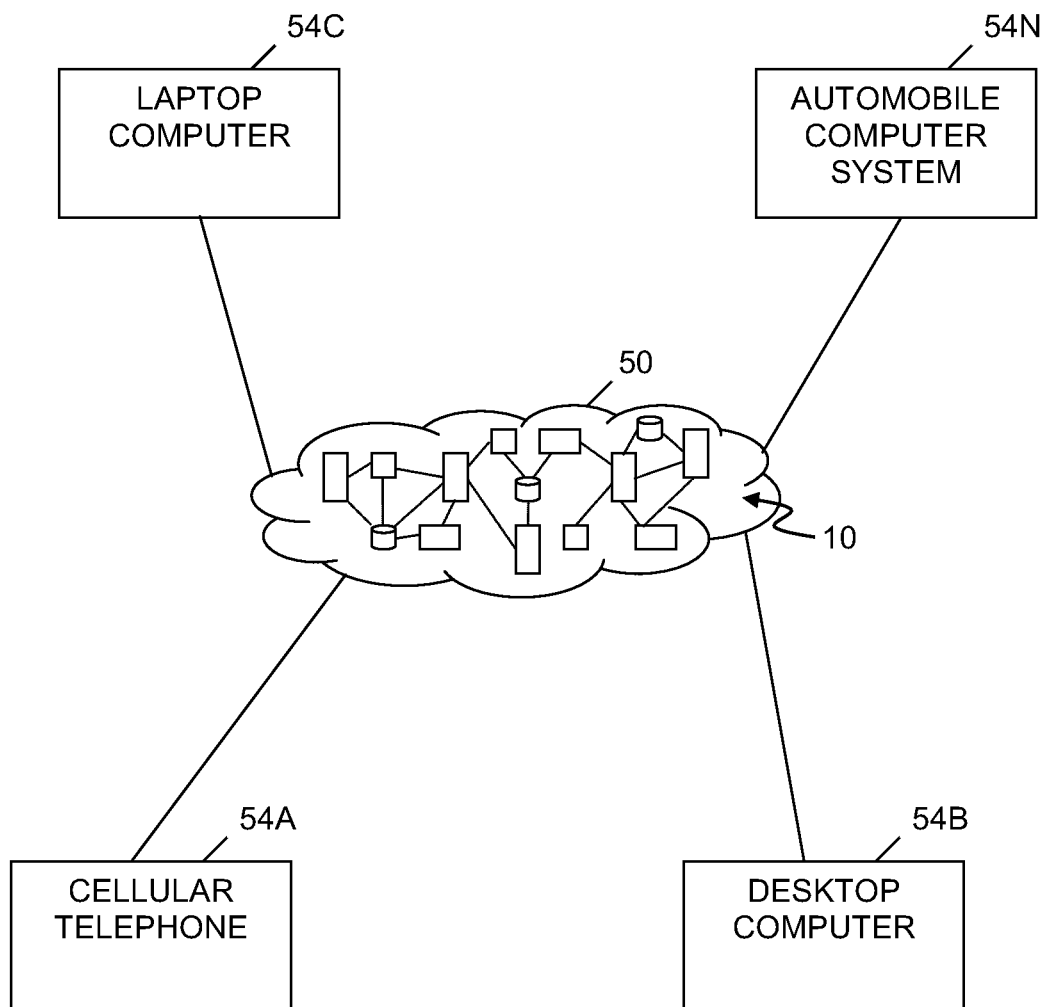
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
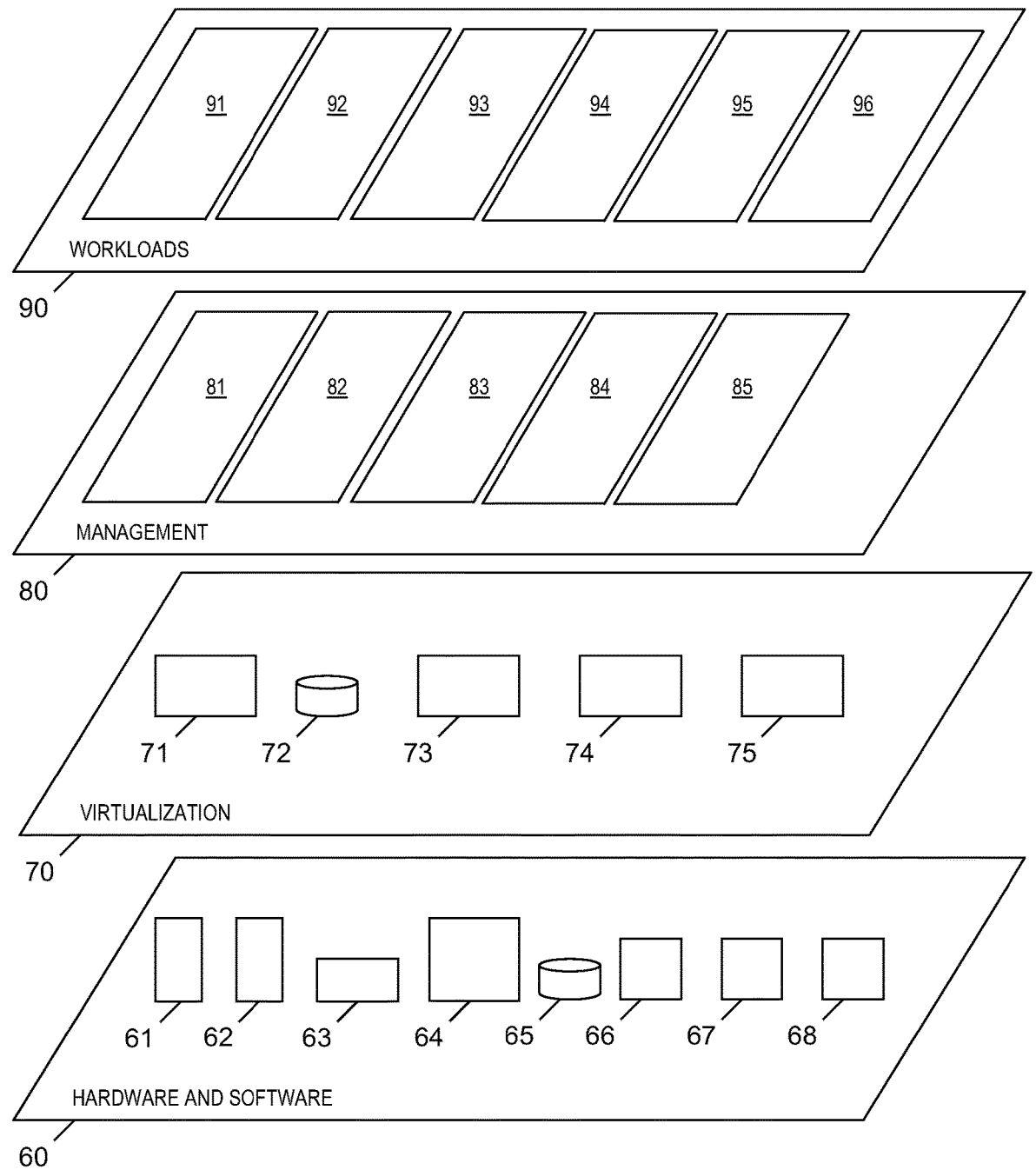
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and timeout and polling interval optimization 96.

What is claimed is:

1. A method of managing a timeout and a polling interval of an operation of an application, the method comprising the steps of:

a computer determining whether a data repository includes a recommendation of a timeout of an operation of an application and a recommendation of a polling interval of the operation of the application, the timeout being a period of time after which the operation is interrupted in response to the operation not being successfully completed, the polling interval being an amount of time between starts of two successive polls of the operation and being based on a type of the operation and an environment of the operation, and the two successive polls being two successive checks of the operation that determine an operational status of the operation;

if the data repository includes the recommendations of the timeout and the polling interval, the computer retrieving from the data repository the recommendations of the timeout and the polling interval and applying the timeout and the polling interval to a first configuration of a workload being deployed, or if the data repository does not include the recommendations of the timeout and the polling interval, the computer receiving a user entry of values for an optimal timeout of the operation and an optimal polling interval of the operation and deploying the workload having a second configuration that includes the values for the optimal timeout and the optimal polling interval;

from a plurality of cloud service providers, the computer receiving polling intervals, numbers of polls for respective operations, respective identifications of the operations, and specifications of respective environments of the operations;

the computer storing the polling intervals, the numbers of polls, the identifications of the operations, and the specifications of the environments of the operations in the data repository;

based on the stored polling intervals, the stored numbers of polls for respective operations, the stored respective identifications of the operations, and the stored specifications of respective environments of the operations, the computer determining a minimum number of polls of the operation in the environment before a successful completion of the operation and the computer determining an old polling interval that was used between the polls of the operation;

if the minimum number of polls is greater than one, the computer determining a new polling interval as the minimum number of polls multiplied by the old polling interval, or if the minimum number of polls equals one, the computer determining the new polling interval by decreasing the old polling interval by a factor of X, wherein X is a configurable value;

the computer updating the recommendation of the polling interval included in the data repository, so the updated recommendation of the polling interval specifies the new polling interval;

the computer receiving a request from a cloud computing environment for the updated recommendation of the polling interval, the cloud computing environment being controlled by a cloud service provider; and responsive to the received request, the computer sending the updated recommendation of the polling interval to the cloud computing environment, even though the cloud service provider did not provide any of the polling intervals, the numbers of polls for respective operations, the respective identifications of the operations, or the specifications of respective environments of the operations that contributed to the updated recommendation of the polling interval.

2. The method of claim 1, further comprising the steps of:

from the plurality of cloud service providers, the computer receiving amounts of time taken to complete the respective operations;

the computer storing the amounts of time taken to complete the operations;

based on the stored amounts of time taken to complete the operations, the identifications of the operations, and the specifications of the environments of the operations, the computer determining a maximum amount of time taken to complete the operation in the environment, which specifies a first cloud service provider included in the plurality of cloud service providers;

the computer determining a new timeout as the maximum amount of time added to a configurable time value that corresponds to the first cloud service provider;

the computer updating the recommendation of the timeout included in the data repository, so the updated recommendation of the timeout specifies the new timeout;

the computer receiving a request from a second cloud computing environment for the updated recommendation of the polling interval, the second cloud computing environment being controlled by a second cloud service provider; and responsive to the received request from the second cloud computing environment, the computer sending the updated recommendation of the timeout to the second cloud computing environment, even though the second cloud service provider did not provide any of the amounts of time taken to complete the operations, the numbers of polls for respective operations, the respective identifications of the operations, or the specifications of respective environments of the operations that contributed to the updated recommendation of the timeout.

3. The method of claim 2, further comprising the steps of:

the computer determining that the data repository does not store a specification of a first environment;

based on the specifications of the environments stored in the data repository, the computer determining the first environment includes a combination of parameters of multiple environments whose specifications are stored in the data repository; and the computer employing a recommendation engine which predicts an optimal timeout for the operation in the first environment based on timeouts in the data repository that are associated with the multiple environments.

4. The method of claim 1, further comprising the steps of:

the computer determining that the data repository does not store a specification of a first environment;

based on specifications of environments stored in the data repository, the computer determining the first environment includes a combination of parameters of multiple environments whose specifications are stored in the data repository; and the computer employing a recommendation engine which predicts an optimal polling interval for the operation in the first environment based on polling intervals in the data repository that are associated with the multiple environments.

5. The method of claim 1, further comprising the steps of:

the computer storing in a heuristic database recommendations of timeouts and polling intervals for respective combinations of operations and environments, each combination including one operation and one environment in which the one operation is performed;

the computer providing a plurality of cloud service providers with access to the heuristic database; and the computer receiving a request from a cloud service provider included in the plurality of cloud service providers for a download of a first recommendation included in the stored recommendations, the first recommendation including a first timeout and a first polling interval recommended for a first operation being performed in a first environment, and the first recommendation being based on operation details provided to the heuristic database by one or more of the cloud service providers, but the cloud service provider from whom the request for the download is received is not required to be included in the one or more of the cloud service providers.

6. The method of claim 1, further comprising the step of:

providing at least one support service for at least one of creating, integrating, hosting, maintaining, and deploying computer-readable program code in the computer, the program code being executed by a processor of the computer to implement the determining whether the data repository includes the recommendations of the timeout and the polling interval, the retrieving the recommendations of the timeout and the polling interval if the data repository includes the recommendations of the timeout and the polling interval and applying the timeout and the polling interval to the first configuration of the workload being deployed or the receiving the user entry of the values for the optimal timeout and the optimal polling interval and deploying the workload having the second configuration, the receiving and the storing of the polling intervals, the numbers of the polls, the identifications of the operations, and the specifications of the environments, the determining the minimum number of the polls, determining the old polling interval, if the minimum number of polls is greater than one, the determining the new polling interval as the minimum number of polls multiplied by the old polling interval, or if the minimum number of polls equals one, the determining the new polling interval by decreasing the old polling interval by the factor of X, the updating the recommendation of the polling interval, the receiving the request for the updated recommendation of the polling interval, and the sending the updated recommendation of the polling interval to the cloud computing environment.

7. The method of claim 1, further comprising the step of: providing software as a service in a first cloud environment, the software being executed by a hardware processor in the first cloud environment to implement the determining whether the data repository includes the recommendations of the timeout and the polling interval, the retrieving the recommendations of the timeout and the polling interval if the data repository includes the recommendations of the timeout and the polling interval and applying the timeout and the polling interval to the first configuration of the workload being deployed or the receiving the user entry of the values for the optimal timeout and the optimal polling interval and deploying the workload having the second configuration, the receiving and the storing of the polling intervals, the numbers of the polls, the identifications of the operations, and the specifications of the environments, the determining the minimum number of the polls, the determining the old polling interval, if the minimum number of polls is greater than one, the determining the new polling interval as the minimum number of polls multiplied by the old polling interval, or if the minimum number of polls equals one, the determining the new polling interval by decreasing the old polling interval by the factor of X, the updating the recommendation of the polling interval, the receiving the request for the updated recommendation of the polling interval, and the sending the updated recommendation of the polling interval to the cloud computing environment.

8. A computer program product, comprising:
a computer-readable storage medium; and
a computer-readable program code stored in the computer-readable storage medium, the computer-readable program code containing instructions that are executed by a central processing unit (CPU) of a computer system to implement a method of managing a timeout and a polling interval of an operation of an application, the method comprising the steps of:
the computer system determining whether a data repository includes a recommendation of a timeout of an operation of an application and a recommendation of a polling interval of the operation of the application, the timeout being a period of time after which the operation is interrupted in response to the operation not being successfully completed, the polling interval being an amount of time between starts of two successive polls of the operation and being based on a type of the operation and an environment of the operation, and the two successive polls being two successive checks of the operation that determine an operational status of the operation;
if the data repository includes the recommendations of the timeout and the polling interval the computer system retrieving from the data repository the recommendations of the timeout and the polling interval and applying the timeout and the polling interval to a first configuration of a workload being deployed, or if the data repository does not include the recommendations of the timeout and the polling interval the computer system receiving a user entry of values for an optimal timeout of the operation and an optimal polling interval of the operation and deploying the workload having a second configuration that includes the values for the optimal timeout and the optimal polling interval;
from a plurality of cloud service providers, the computer system receiving polling intervals, numbers of polls for respective operations, respective identifications of the operations, and specifications of respective environments of the operations;
the computer system storing the polling intervals, the numbers of polls, the identifications of the operations, and the specifications of the environments of the operations in the data repository;
based on the stored polling intervals, the stored numbers of polls for respective operations, the stored respective identifications of the operations, and the stored specifications of respective environments of the operations, the computer system determining a minimum number of polls of the operation in the environment before a successful completion of the operation and the computer system determining an old polling interval that was used between the polls of the operation;
if the minimum number of polls is greater than one, the computer system determining a new polling interval as the minimum number of polls multiplied by the old polling interval, or if the minimum number of polls equals one, the computer system determining the new polling interval by decreasing the old polling interval by a factor of X, wherein X is a configurable value;
the computer system updating the recommendation of the polling interval included in the data repository, so the updated recommendation of the polling interval specifies the new polling interval;
the computer system receiving a request from a cloud computing environment for the updated recommendation of the polling interval the cloud computing environment being controlled by a cloud service provider; and
responsive to the received request, the computer system sending the updated recommendation of the polling interval to the cloud computing environment, even though the cloud service provider did not provide any of the polling intervals, the numbers of polls for respective operations, the respective identifications of the operations, or the specifications of respective environments of the operations that contributed to the updated recommendation of the polling interval.

9. The computer program product of claim 8, wherein the method further comprises the steps of:
from the plurality of cloud service providers, the computer system receiving amounts of time taken to complete the respective operations;
the computer system storing the amounts of time taken to complete the operations;
based on the stored amounts of time taken to complete the operations, the identifications of the operations, and the specifications of the environments of the operations, the computer system determining a maximum amount of time taken to complete the operation in the environment, which specifies a first cloud service provider included in the plurality of cloud service providers;
the computer system determining a new timeout as the maximum amount of time added to a configurable time value that corresponds to the first cloud service provider;
the computer system updating the recommendation of the timeout included in the data repository, so the updated recommendation of the timeout specifies the new timeout;
the computer system receiving a request from a second cloud computing environment for the updated recommendation of the polling interval, the second cloud computing environment being controlled by a second cloud service provider; and responsive to the received request from the second cloud computing environment, the computer system sending the updated recommendation of the timeout to the second cloud computing environment, even though the second cloud service provider did not provide any of the amounts of time taken to complete the operations, the numbers of polls for respective operations, the respective identifications of the operations, or the specifications of respective environments of the operations that contributed to the updated recommendation of the timeout.

10. The computer program product of claim 9, wherein the method further comprises the steps of:

the computer system determining that the data repository does not store a specification of a first environment;

based on the specifications of the environments stored in the data repository, the computer system determining the first environment includes a combination of parameters of multiple environments whose specifications are stored in the data repository; and the computer system employing a recommendation engine which predicts an optimal timeout for the operation in the first environment based on timeouts in the data repository that are associated with the multiple environments.

11. The computer program product of claim 8, wherein the method further comprises the steps of:

the computer system determining that the data repository does not store a specification of a first environment;

based on specifications of environments stored in the data repository, the computer system determining the first environment includes a combination of parameters of multiple environments whose specifications are stored in the data repository; and the computer system employing a recommendation engine which predicts an optimal polling interval for the operation in the first environment based on polling intervals in the data repository that are associated with the multiple environments.

12. The computer program product of claim 8, wherein the method further comprises the steps of:

the computer system storing in a heuristic database recommendations of timeouts and polling intervals for respective combinations of operations and environments, each combination including one operation and one environment in which the one operation is performed;

the computer system providing a plurality of cloud service providers with access to the heuristic database; and the computer system receiving a request from a cloud service provider included in the plurality of cloud service providers for a download of a first recommendation included in the stored recommendations, the first recommendation including a first timeout and a first polling interval recommended for a first operation being performed in a first environment, and the first recommendation being based on operation details provided to the heuristic database by one or more of the cloud service providers, but the cloud service provider from whom the request for the download is received is not required to be included in the one or more of the cloud service providers.

13. A computer system comprising:
a central processing unit (CPU);
a memory coupled to the CPU; and
a computer-readable storage device coupled to the CPU, the storage device containing instructions that are executed by the CPU via the memory to implement a method of managing a timeout and a polling interval of an operation of an application, the method comprising the steps of:

the computer system determining whether a data repository includes a recommendation of a timeout of an operation of an application and a recommendation of a polling interval of the operation of the application, the timeout being a period of time after which the operation is interrupted in response to the operation not being successfully completed, the polling interval being an amount of time between starts of two successive polls of the operation and being based on a type of the operation and an environment of the operation, and the two successive polls being two successive checks of the operation that determine an operational status of the operation;

if the data repository includes the recommendations of the timeout and the polling interval, the computer system retrieving from the data repository the recommendations of the timeout and the polling interval and applying the timeout and the polling interval to a first configuration of a workload being deployed, or if the data repository does not include the recommendations of the timeout and the polling interval, the computer system receiving a user entry of values for an optimal timeout of the operation and an optimal polling interval of the operation and deploying the workload having a second configuration that includes the values for the optimal timeout and the optimal polling interval;

from a plurality of cloud service providers, the computer system receiving polling intervals, numbers of polls for respective operations, respective identifications of the operations, and specifications of respective environments of the operations;

the computer system storing the polling intervals, the numbers of polls, the identifications of the operations, and the specifications of the environments of the operations in the data repository;

based on the stored polling intervals, the stored numbers of polls for respective operations, the stored identifications of the operations, and the stored specifications of respective environments of the operations, the computer system determining a minimum number of polls of the operation in the environment before a successful completion of the operation and the computer system determining an old polling interval that was used between the polls of the operation;

if the minimum number of polls is greater than one, the computer system determining a new polling interval as the minimum number of polls multiplied by the old polling interval, or if the minimum number of polls equals one, the computer system determining the new polling interval by decreasing the old polling interval by a factor of X, wherein X is a configurable value;

the computer system updating the recommendation of the polling interval included in the data repository, so the updated recommendation of the polling interval specifies the new polling interval;

the computer system receiving a request from a cloud computing environment for the updated recommendation of the polling interval, the cloud computing environment being controlled by a cloud service provider; and responsive to the received request, the computer system sending the updated recommendation of the polling interval to the cloud computing environment, even though the cloud service provider did not provide any of the polling intervals, the numbers of polls for respective operations, the respective identifications of the operations, or the specifications of respective environments of the operations that contributed to the updated recommendation of the polling interval.

14. The computer system of claim 13, wherein the method further comprises the steps of:

from the plurality of cloud service providers, the computer system receiving amounts of time taken to complete the respective operations;

the computer system storing the amounts of time taken to complete the operations;

based on the stored amounts of time taken to complete the operations, the identifications of the operations, and the specifications of the environments of the operations, the computer system determining a maximum amount of time taken to complete the operation in the environment, which specifies a first cloud service provider included in the plurality of cloud service providers;

the computer system determining a new timeout as the maximum amount of time added to a configurable time value that corresponds to the first cloud service provider;

the computer system updating the recommendation of the timeout included in the data repository, so the updated recommendation of the timeout specifies the new timeout;

the computer system receiving a request from a second cloud computing environment for the updated recommendation of the polling interval, the second cloud computing environment being controlled by a second cloud service provider; and responsive to the received request from the second cloud computing environment, the computer system sending the updated recommendation of the timeout to the second cloud computing environment, even though the second cloud service provider did not provide any of the amounts of time taken to complete the operations, the numbers of polls for respective operations, the respective identifications of the operations, or the specifications of respective environments of the operations that contributed to the updated recommendation of the timeout.

15. The computer system of claim 14, wherein the method further comprises the steps of:

the computer system determining that the data repository does not store a specification of a first environment;

based on the specifications of the environments stored in the data repository, the computer system determining the first environment includes a combination of parameters of multiple environments whose specifications are stored in the data repository; and the computer system employing a recommendation engine which predicts an optimal timeout for the operation in the first environment based on timeouts in the data repository that are associated with the multiple environments.

16. The computer system of claim 13, wherein the method further comprises the steps of:

the computer system determining that the data repository does not store a specification of a first environment;

based on specifications of environments stored in the data repository, the computer system determining the first environment includes a combination of parameters of multiple environments whose specifications are stored in the data repository; and the computer system employing a recommendation engine which predicts an optimal polling interval for the operation in the first environment based on polling intervals in the data repository that are associated with the multiple environments.

17. The computer system of claim 13, wherein the method further comprises the steps of:

the computer system storing in a heuristic database recommendations of timeouts and polling intervals for respective combinations of operations and environments, each combination including one operation and one environment in which the one operation is performed;

the computer system providing a plurality of cloud service providers with access to the heuristic database; and the computer system receiving a request from a cloud service provider included in the plurality of cloud service providers for a download of a first recommendation included in the stored recommendations, the first recommendation including a first timeout and a first polling interval recommended for a first operation being performed in a first environment, and the first recommendation being based on operation details provided to the heuristic database by one or more of the cloud service providers, but the cloud service provider from whom the request for the download is received is not required to be included in the one or more of the cloud service providers.

* * * * *